(12) United States Patent
Koizumi et al.

(10) Patent No.: US 12,279,624 B2
(45) Date of Patent: Apr. 22, 2025

(54) CUTTING APPARATUS

(71) Applicant: MAYEKAWA MFG. CO., LTD., Tokyo (JP)

(72) Inventors: Akira Koizumi, Tokyo (JP); Koji Kido, Tokyo (JP); Masashi Matsumoto, Tokyo (JP); Masaomi Watanabe, Tokyo (JP); Shinji Hane, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 18/575,902

(22) PCT Filed: Jun. 9, 2023

(86) PCT No.: PCT/JP2023/021551
§ 371 (c)(1),
(2) Date: Jan. 2, 2024

(87) PCT Pub. No.: WO2024/034249
PCT Pub. Date: Feb. 15, 2024

(65) Prior Publication Data
US 2025/0000105 A1  Jan. 2, 2025

(30) Foreign Application Priority Data

Aug. 8, 2022 (JP) ................. 2022-126570

(51) Int. Cl.
*A22C 17/00* (2006.01)
*A22C 17/02* (2006.01)

(52) U.S. Cl.
CPC .......... *A22C 17/0006* (2013.01); *A22C 17/02* (2013.01)

(58) Field of Classification Search
CPC . A22C 17/0006; A22C 17/02; A22C 21/0076; A22C 17/004
USPC ........................................... 452/149
See application file for complete search history.

(56) References Cited

U.S. PATENT DOCUMENTS 3,766,604 A * 10/1973 Lunn .................... A22C 15/003
452/187
4,843,682 A    7/1989 Bowen
6,179,701 B1 * 1/2001 Tieleman ........... A22C 21/0053
452/179
(Continued)

FOREIGN PATENT DOCUMENTS

CN     205794678 U    12/2016
CN     107912517 A     4/2018
(Continued)

OTHER PUBLICATIONS

International Search Report issued in Intl. Appln. No. PCT/JP2023/021551, mailed Jul. 18, 2023.
(Continued)

*Primary Examiner* — Richard T Price, Jr.
(74) *Attorney, Agent, or Firm* — ROSSI, KIMMS & McDOWELL LLP

(57) ABSTRACT

A cutting apparatus cuts a string in a workpiece by bringing a cutter into contact with the workpiece while rotating the workpiece supported by a clamper. The workpiece supported by the clamper is restrained by a holding member from the opposite side from the cutter. The holding member is elastically supported by a support part.

7 Claims, 4 Drawing Sheets

(56) References Cited

U.S. PATENT DOCUMENTS

| | | | |
|---|---|---|---|
| 7,059,954 B2 * | 6/2006 | Annema | A22C 21/0092 |
| | | | 452/136 |
| 8,882,571 B2 | 11/2014 | Hazenbroek et al. | |
| 2016/0262409 A1 | 9/2016 | Peters et al. | |
| 2021/0084916 A1 | 3/2021 | Kido et al. | |
| 2024/0180177 A1 * | 6/2024 | Nakamura | A22C 17/02 |

FOREIGN PATENT DOCUMENTS

| | | |
|---|---|---|
| EP | 2277384 A1 | 1/2011 |
| EP | 3120706 B1 | 5/2018 |
| JP | 2016528923 A | 9/2016 |
| JP | 6081019 B2 | 2/2017 |
| WO | 2009139032 A1 | 11/2009 |
| WO | 2019131357 A1 | 7/2019 |
| WO | 2019131363 A1 | 7/2019 |

OTHER PUBLICATIONS

Written Opinion issued in Intl. Appln. No. PCT/JP2023/021551, mailed Jul. 18, 2023.

Extended European search report issued in European Appln. No. 23852233.8, mailed on Dec. 10, 2024.

International Preliminary Report on Patentability issued in Intl. Application No. PCT/JP2023/021551 mailed on Feb. 20, 2025.

\* cited by examiner

CUTTING APPARATUS

TECHNICAL FIELD

The present disclosure relates to a cutting apparatus.

BACKGROUND

In the field of meat processing, where meat like chicken, beef, and pork are handled, automation using meat processing machinery has been promoted. For example, in a meat processing process in which bone-in meat as a workpiece, such as a leg of a chicken like a turkey, is separated into bone and meat, a cutting apparatus is used to slit a predetermined portion of the bone-in meat as pre-processing. Such slitting is performed to facilitate separation of meat from bone by previously making cuts or severing relatively hard tendons of the bone-in meat that is suspended and supported.

Patent Document 1 discloses an example of the meat processing machinery for bone-in meat as a workpiece. This document shows a configuration related to a so-called meat separator for separating bone-in meat after slitting into meat and bone, where the meat is separated from the bone by making access of a movable separator to the suspended and supported workpiece from one side while stabilizing the posture of the workpiece with a fixed separator from the other side of the workpiece.

CITATION LIST

Patent Literature

Patent Document 1: JP6081019B

SUMMARY

Problems to be Solved

When working on the suspended and supported workpiece, bone-in meat, as in Patent Document 1, the posture of the workpiece can be stabilized by guiding the workpiece from one side with a holding member such as the fixed separator. Such a mechanism could be employed in the process of slitting a predetermined portion of the bone-in meat as described above, in meat processing machinery in which various processes are performed sequentially while the suspended and supported workpiece moves along a predetermined track.

Specifically, the workpiece is guided by placing a fixed holding member near the track of the workpiece suspended and supported by a clamper. A cutter is then applied to the workpiece guided by the holding member from the opposite side from the holding member, and the workpiece is rotated to cut the meat and tendons around the bone, thereby slitting a predetermined portion of the workpiece (for example, around the ankle). In such pre-processing of bone-in meat, it is necessary to properly cut the meat and tendons around the bone without cutting the bone itself in order to feed the workpiece in proper condition for the subsequent processing steps. In general, there is no small variation in the size of bone-in meat, and in particular, the size of bone-in meat of turkey varies greatly depending on sex (male or female). Furthermore, bone-in meat generally has a non-perfect circular cross-section. When using a fixed holding member as described above, the holding member to restrain the workpiece during cutting is secured in a fixed position regardless of the size of the workpiece. Therefore, for example, if the workpiece is relatively small, the meat and tendons around the bone are prone to remain. On the other hand, if the workpiece is relatively large, it is easy to cut the bone itself in addition to the meat and tendons around the bone to be cut. Such cutting failures can lead to workpieces that cannot be properly treated in the subsequent steps after pre-processing.

At least one embodiment of the present disclosure was made in view of the above circumstances, and an object thereof is to provide a cutting apparatus capable of cutting a required portion properly regardless of the size of bone-in meat.

Solution to the Problems (1) To solve the above problem, a cutting apparatus according to one aspect includes: a clamper (102) for rotatably supporting a workpiece (W) which is a bone-in meat; a cutter (104) for cutting a string in the workpiece by bringing the cutter into contact with the workpiece while rotating the workpiece supported by the clamper; a holding member (106) for restraining the workpiece supported by the clamper from the opposite side from the cutter; and a support part (108) elastically supporting the holding member.

According to the above aspect (1), the holding member for restraining the workpiece is elastically supported by the support part when the workpiece is rotated and cut with the cutter. Thus, even if the size of the workpiece varies, the holding member can be rocked by the elastic force received according to the size of the workpiece. Therefore, the cutter's contact with the workpiece restrained by the holding member is adjusted according to the size of the workpiece, and a required portion of the workpiece can be cut properly.

(2) In another aspect, in the above aspect (1), the support part is capable of switching between a first position (P1) where the holding member is in contact with the workpiece supported by the clamper and a second position (P2) where the holding member is separated from the workpiece supported by the clamper.

According to the above aspect (2), the support part elastically supporting the holding member is configured such that the holding member can switch between the first position and the second position. In the case where the holding member is switched to the first position, as described above, the workpiece is elastically restrained by the holding member, so that a required portion of the workpiece can be cut properly. On the other hand, in the case where the holding member is switched to the second position, for example, the holding member can be retracted when the workpiece supported by the clamper is conveyed along a predetermined track to prevent interference between the conveyed workpiece and the holding member.

(3) In another aspect, in the above aspect (1) or (2), the magnitude of elastic force of the support part to support the holding member is variable.

According to the above aspect (3), the positional relationship between the cutter and the workpiece restrained by the holding member can be adjusted by changing the magnitude of elastic force to support the holding member. This allows the user to adjust the degree of cutting of the workpiece by setting the elastic force.

(4) In another aspect, in any of the above aspects (1) to (3), the support part includes an air cylinder (110) for providing the elastic force to support the holding member.

According to the above aspect (4), by configuring the support member to include an air cylinder, the support part capable of elastically supporting the holding member can be suitably achieved.

(5) In another aspect, in any one of the above aspects (1) to (4), the holding member has a contact surface (106c) capable of contacting the workpiece, and the contact surface has a recess (106d) corresponding to the surface shape of the workpiece.

According to the above aspect (5), a recess is provided in the contact surface of the holding member with the workpiece. Thus, the workpiece engages the recess when the workpiece is elastically restrained by the holding member, so that the posture of the workpiece can be stably maintained during cutting.

(6) In another aspect, in any one of the above aspects (1) to (5), the cutter is elastically supported.

According to the above aspect (6), the cutter located on the opposite side from the holding member which elastically restrains the workpiece during cutting is also elastically supported. As a result, the workpiece is rotated while being clamped between the elastically supported holding member and the cutter, so that the required portion can be cut properly.

(7) In another aspect, in any one of the above aspects (1) to (6), the workpiece has a non-perfect circular cross-section at a position where the workpiece is cut by the cutter.

According to the above aspect (7), the cutting apparatus capable of properly cutting a required portion of the workpiece having a non-perfect circular cross-section can be achieved.

Advantageous Effects

At least one embodiment of the present disclosure provides a cutting apparatus capable of cutting a required portion properly regardless of the size of bone-in meat.

DETAILED DESCRIPTION

Embodiments will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

Figure 1:
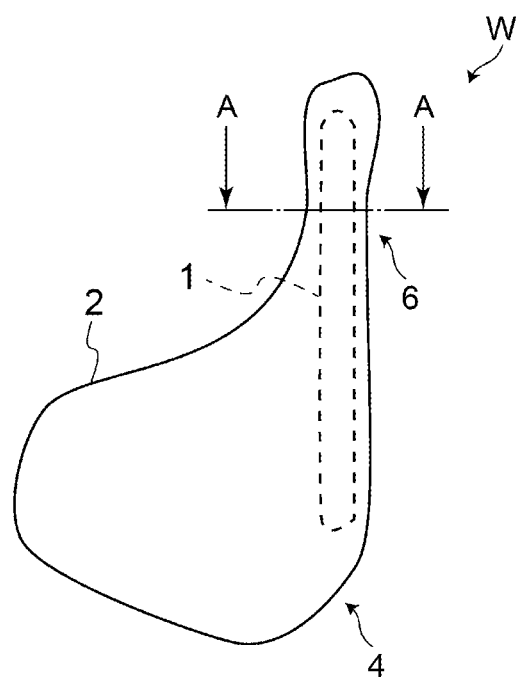
FIG. 1 is a schematic side view of a workpiece.
Figure 2:
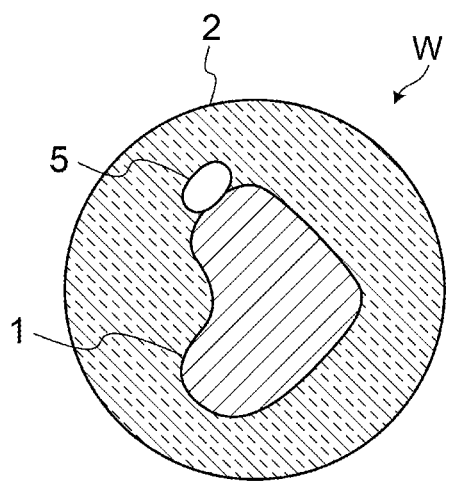
FIG. 2 is a cross-sectional view taken along line A-A in FIG. 1.

First, a workpiece W to be cut by a cutting apparatus 100 will be described with reference to FIGS. 1 and 2. FIG. 1 is a schematic side view of the workpiece W. FIG. 2 is a cross-sectional view taken along line A-A in FIG. 1.

The workpiece W is so-called bone-in meat with a meat portion 2 around a bone portion 1. In this embodiment, the bone-in meat, specifically a leg of turkey, is treated as the workpiece W, but there are no restrictions on the type or part of the meat, such as beef, pork, chicken, etc. As shown in FIG. 1, the workpiece W has a body part 4 with a large amount of the meat portion 2 relative to the bone portion 1, and an ankle part 6 that is relatively smaller in thickness and has little meat portion 2 than the body part 4. Further, as shown in FIG. 2, the bone portion 1 has a non-perfect circular cross-section, and a tendon 5 is on a portion of the outer surface of the bone portion 1. The tendon 5 is a tissue that extends along the outer surface of the bone portion 1 and is harder than the meat portion 2.

Figure 3:
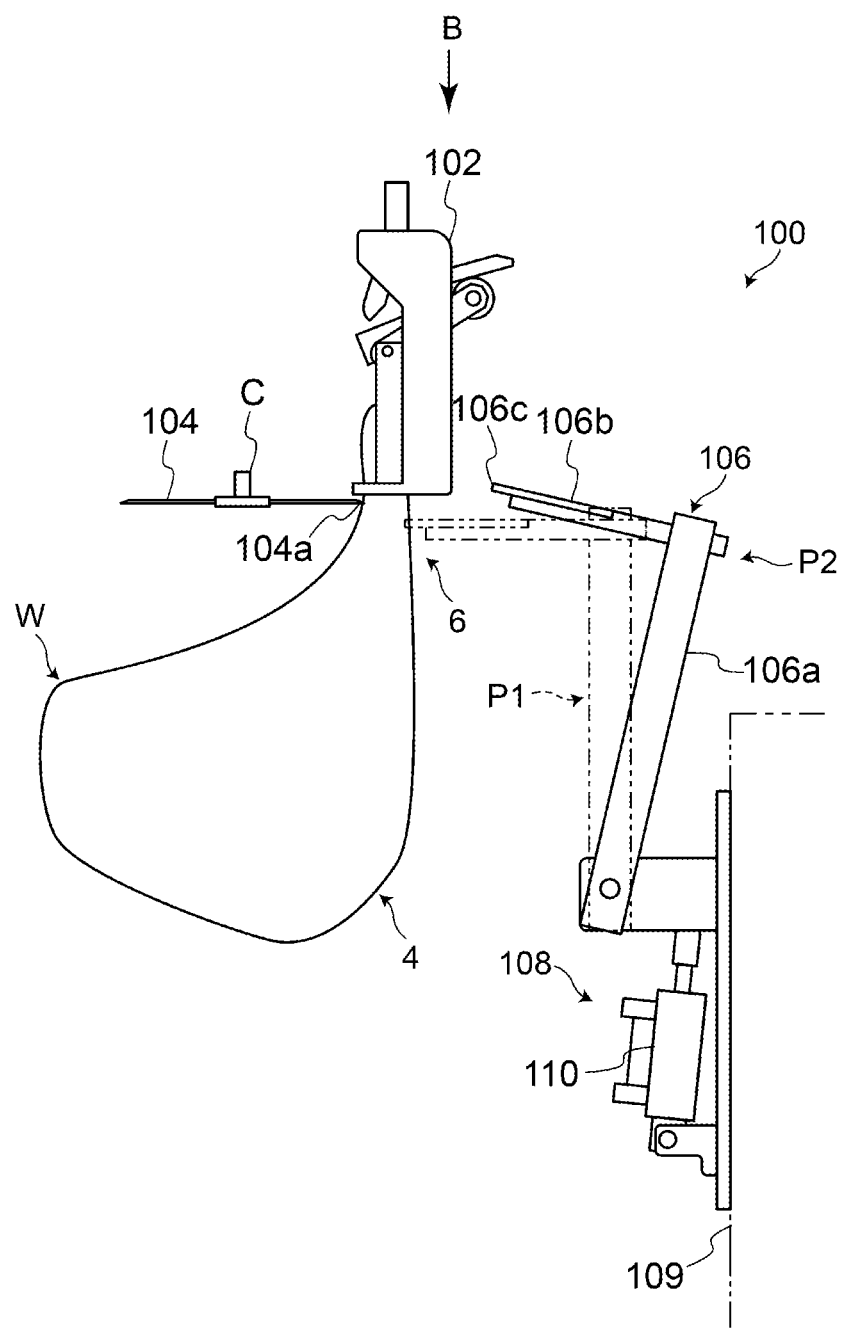
FIG. 3 is a schematic side view of a cutting apparatus according to an embodiment.
Figure 4:
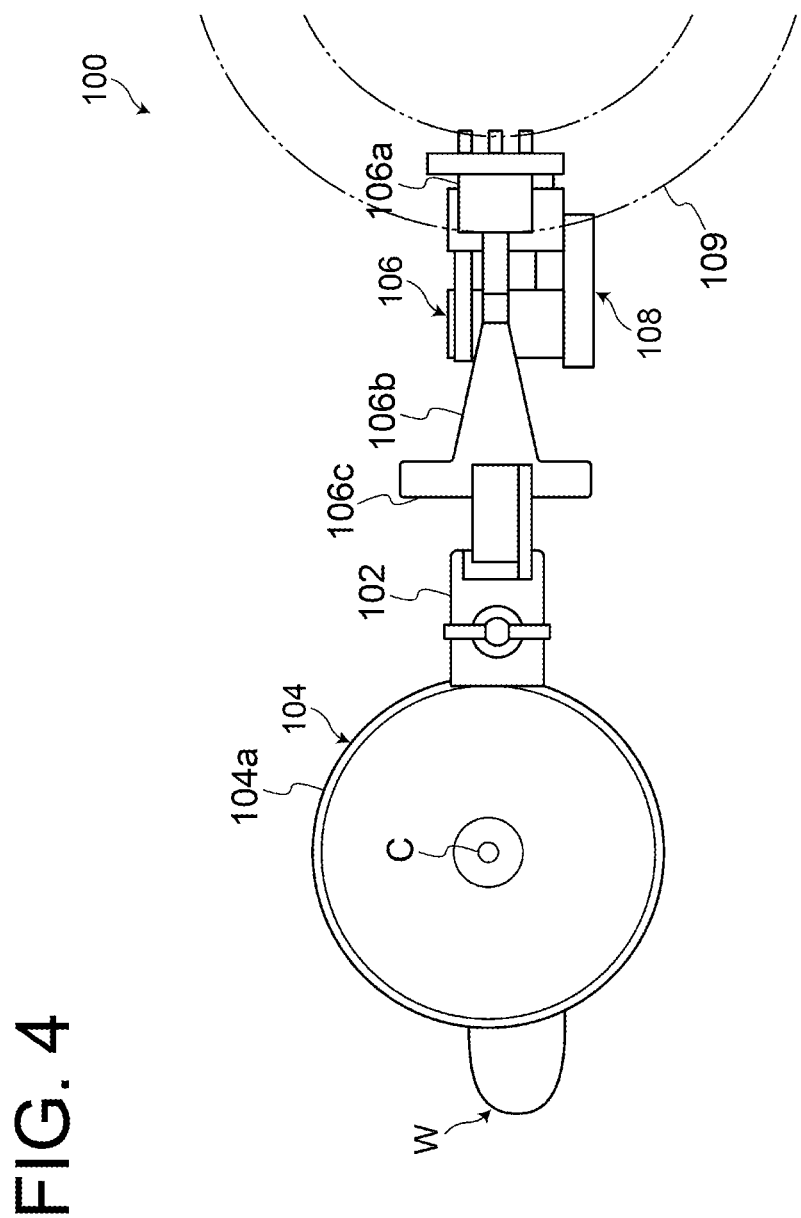
FIG. 4 is a top view seen from direction B in FIG. 3.

Next, a cutting apparatus 100 for cutting the workpiece W having the above configuration will be described. FIG. 3 is a schematic side view of the cutting apparatus 100 according to an embodiment. FIG. 4 is a top view seen from direction B in FIG. 3.

The cutting apparatus 100 is an apparatus for performing the so-called ankle cutting process, in which a cut is made in the ankle part 6 along the circumference of the bone portion 1 as pre-processing for separating the meat portion 2 from the bone portion 1 in the workpiece W. In the ankle cutting process, a cut is made in the ankle part 6 along the circumferential direction, which serves as the starting point for the subsequent separation of the meat portion 2 from the bone portion 1. In this process, the cutting apparatus 100 must properly cut the meat portion 2 around the bone portion 1 and the tendon 5, a relatively hard portion which hinders the separation. Further, in the slitting process using the cutting apparatus 100, if the bone portion 1 is also cut, the meat portion 2 may not be properly separated from the bone portion 1 in the subsequent process for separation of the meat portion 2, or a part of the bone portion 1 may be separated together with the meat portion 2 and thus may be mixed in as a foreign substance with the processed meat after processing. Therefore, the cutting apparatus 100 is required to properly cut the meat portion 2 and the tendon 5 in the ankle part 6, while avoiding cutting to the bone portion 1.

The cutting apparatus 100 is equipped with a clamper 102 for rotatably supporting the workpiece W. The clamper 102 is configured to grip one end of the workpiece W close to the ankle part 6. Although the detailed structure of the clamper 102 will not be described, in this embodiment, the clamper 102 supports the workpiece W so that the ankle part 6, which is the portion to be cut by the cutting apparatus 100, is exposed below while one end of the workpiece W is inserted in the clamper 102.

Further, the cutting apparatus 100 is incorporated as part of each step in a series of meat processing process to separate the meat portion 2 from the bone portion 1. The clamper 102 can move along a rail (not shown) to sequentially convey the workpiece W to each step. Specifically, the clamper 102 can move along the rail (not shown) to carry in the workpiece W before cutting to the cutting apparatus 100 and carry out the workpiece W cut by the cutting apparatus 100 to the next step.

The cutting apparatus 100 is equipped with a cutter 104 for cutting the ankle part 6 of the workpiece W. The cutter 104 is a disk-shaped cutter with an arc-shaped tooth surface 104a, supported around a central axis C along a substantially vertical direction (the central axis C is fixed to an unshown peripheral structure). The cutter 104 is installed so that the tooth surface 104a is substantially horizontal with respect to the central axis C and facing one side of the ankle part 6, which is the portion of the workpiece W gripped by the clamper 102 to be cut.

The tooth surface 104a of the cutter 104 may be straight.

The cutting apparatus 100 is equipped with a holding member 106 for restraining the workpiece W supported by the clamper 102 from the opposite side from the cutter 104. The holding member 106 is placed on the opposite side of the workpiece W from the cutter 104. Thus, the workpiece W is restrained by the holding member 106, and the cutter 104 is brought into contact with the ankle part 6 from the opposite side from the holding member 106. When the clamper 102 is rotated in this state by driving force from an external source, the workpiece W supported by the clamper 102 rotates while being restrained by the holding member 106 between the holding member 106 and the cutter 104, so that the ankle part 6 is cut along the circumferential direction.

It is preferable that the position where the tooth surface 104a of the cutter 104 is in contact with the workpiece W and the position where the holding member 106 is in contact with the workpiece W are of substantially equal height, but as shown in FIG. 3, there may be some difference in height between the two positions.

The holding member 106 has an arm part 106a and a contact part 106b. The arm part 106a has a shape that allows the contact part 106b at its tip to be in contact with a predetermined portion of the workpiece W. As described above, the contact part 106b is configured to come into contact with the workpiece W at a height approximately equal to the position where the tooth surface 104a of the cutter 104 is in contact with the workpiece W. In this embodiment, as described below, the holding member 106 is capable of switching between the first position P1 and the second position P2 (in FIG. 3, the first position P1 is shown by the double-dotted dashed line and the second position P2 by the solid line). In the first position P1, the holding member 106 takes a posture in which the contact part 106b is in contact with the workpiece W. In the second position P2, the holding member 106 takes a posture in which the contact part 106b is retracted from the workpiece W.

The contact part 106b is the portion in contact with the workpiece W when the holding member 106 is in the first position P1. In this embodiment, the contact part 106b is formed to increase in width toward the side that contacts the workpiece W. As a result, even if the size of the workpiece W varies, the workpiece W can be caught by the contact part 106b accurately, and the contact part 106b can be securely brought into contact with the workpiece W.

Figure 5:
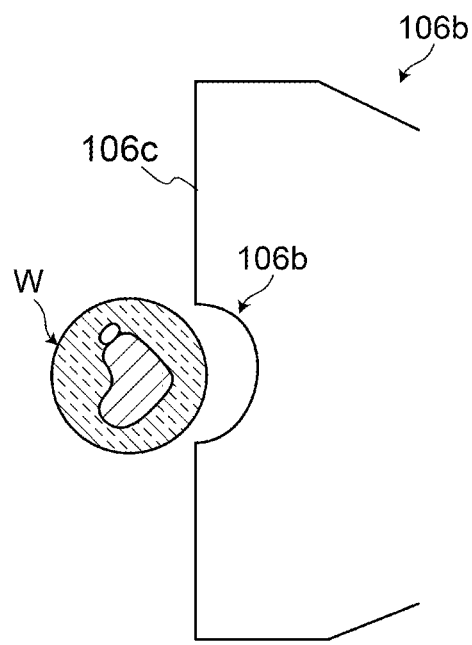
FIG. 5 is an enlarged view of the vicinity of a contact surface of a holding member.

FIG. 5 is an enlarged view of the vicinity of the contact surface 106c of the holding member 106. As shown in FIG. 5, the contact surface 106c of the contact part 106b which contacts the workpiece W may have a recess 106d corresponding to the shape of the outer surface of the workpiece W. Thus, when the contact part 106b comes into contact with the workpiece W, a part of the workpiece W engages the recess 106d, so that the workpiece W can be caught by the contact part 106b more accurately.

The contact part 106b may be detachable from the arm part 106a. In this case, by replacing the contact part 106b, it can be used for a wider range of sizes and types of workpieces W.

The cutting apparatus 100 is equipped with a support part 108 for elastically supporting the holding member 106. The support part 108 elastically supports the holding member 106 with respect to a peripheral structure 109 of the cutting apparatus 100. As a result, the holding member 106 supported by the support part 108 restrains the workpiece W with a predetermined elastic force. Thus, even if the size of the workpiece W varies, the holding member 106 can adjust the degree of contact of the cutter 104, which is located on the opposite side of the workpiece W, by rocking the holding member 106 according to the size of the workpiece W. For example, if the workpiece W is small, the depth of cut of the cutter 104 into the workpiece W is adjusted to the extent that there is no uncut portion of the meat portion 2 or the tendon 5 of the workpiece W. On the other hand, if the workpiece W is large, the depth of cut of the cutter 104 into the workpiece W is adjusted so that the meat portion 2 and the tendon 5 can be accurately cut without cutting the bone portion 1 in the workpiece W. Thus, by elastically supporting the holding member 106 with the support part 108, the degree of contact of the cutter 104 with the workpiece W restrained by the holding member 106 is adjusted according to the size of the workpiece W, and a required portion of the workpiece W can be cut properly.

The support part 108 is capable of switching between the first position P1 where the holding member 106 is in contact with the workpiece W supported by the clamper 102 and the second position P2 where the holding member 106 is separated from the workpiece W supported by the clamper 102. In the case where the holding member 106 is switched to the first position P1, as described above, the workpiece W is elastically restrained by the holding member 106 (the holding member 106 is elastically pressed against the workpiece W), so that a required portion of the workpiece W can be cut properly. On the other hand, in the case where the holding member 106 is switched to the second position P2, for example, the holding member 106 can be retracted when the workpiece W supported by the clamper 102 is conveyed along a predetermined track to prevent interference between the conveyed workpiece W and the holding member 106.

The support part 108 for elastically supporting the holding member 106 includes, for example, an air cylinder 110. In this case, by adjusting the air pressure of the air cylinder 110, the magnitude of elastic force of the support part 108 to support the holding member 106 can be easily changed. This allows adjustment of the magnitude of elastic force to restrain the workpiece W by the holding member 106 (in other words, elastic force with which the workpiece W is held by the holding member 106) when the holding member 106 is switched to the first position P1. For example, if the amount of cut into the workpiece W is small (e.g., if uncut portions are prone to remain in the meat portion 2 or the tendon 5), the air pressure of the air cylinder 110 may be adjusted so that the elastic force increases to appropriately improve the amount of cut into the workpiece W. On the other hand, if the amount of cut into the workpiece W is too much (e.g., if the cut extends to the bone portion 1 as well as the meat portion 2 and the tendon 5), the air pressure of the air cylinder 110 may be adjusted so that the elastic force decreases to reduce the amount of cutting with the cutter 104 into the workpiece W and appropriately improve the amount of cut into the workpiece W. For example, the user may change the setting of the air cylinder 110 for such adjustment of elastic force to suitably control the cutting quality of the workpiece W.

As another aspect of the support part 108, for example, a member capable of providing the elastic force, such as a spring member, may be used.

In the above-described embodiment, the case in which the cutter 104 is fixed to the peripheral structure (not shown) is illustrated, but the cutter 104 may also be elastically supported by the peripheral structure. In this case, the workpiece W gripped by the clamper 102 is rotated while being elastically restrained from both sides by the cutter 104 and the holding member 106, which allows finer adjustment of the cutting quality along the circumference of the ankle part 6.

As described above, according to the above-described embodiment, the holding member 106 for restraining the workpiece W is elastically supported by the support part 108 when the workpiece W is rotated and cut with the cutter 104. Thus, even if the size of the workpiece W varies, the holding member 106 can be rocked by the elastic force received according to the size of the workpiece W. Therefore, the degree of contact of the cutter 104 with the workpiece W restrained by the holding member 106 is adjusted according to the size of the workpiece W, and a required portion of the workpiece W can be cut properly. Thus, it is possible to provide the cutting apparatus 100 capable of cutting a required portion properly regardless of the size of bone-in meat.

REFERENCE SIGNS LIST

1 Bone portion
2 Meat portion
4 Body part
5 Tendon
6 Ankle part
100 Cutting apparatus
102 Clamper
104 Cutter
104a Tooth surface
106 Holding member
106a Arm part
106b Contact part
106c Contact surface
106d Recess
108 Support part
109 Peripheral structure
110 Air cylinder
C Central axis
P1 First position
P2 Second position
W Workpiece

The invention claimed is:

1. A cutting apparatus, comprising:
a clamper for rotatably supporting a workpiece which is a bone-in meat;
a cutter for cutting a string in the workpiece by bringing the cutter into contact with the workpiece while rotating the workpiece supported by the clamper;
a holding member for restraining the workpiece supported by the clamper from an opposite side from the cutter; and
a support part elastically supporting the holding member.

2. The cutting apparatus according to claim 1, wherein the support part is capable of switching between a first position where the holding member is in contact with the workpiece supported by the clamper and a second position where the holding member is separated from the workpiece supported by the clamper.

3. The cutting apparatus according to claim 1, wherein magnitude of elastic force of the support part to support the holding member is variable.

4. The cutting apparatus according to claim 1, wherein the support part includes an air cylinder for providing elastic force to support the holding member.

5. The cutting apparatus according to claim 1, wherein the holding member has a contact surface capable of contacting the workpiece, and
wherein the contact surface has a recess corresponding to a surface shape of the workpiece.

6. The cutting apparatus according to claim 1, wherein the cutter is elastically supported.

7. The cutting apparatus according to claim 1, wherein the workpiece has a non-perfect circular cross-section at a position where the workpiece is cut by the cutter.

* * * * *